Sept. 24, 1940.   H. A. THOMPSON   2,215,892
ANNUNCIATING APPARATUS
Filed June 28, 1939   2 Sheets-Sheet 2

INVENTOR
Howard A. Thompson
BY
HIS ATTORNEY

Patented Sept. 24, 1940

2,215,892

UNITED STATES PATENT OFFICE 2,215,892

ANNUNCIATING APPARATUS

Howard A. Thompson, Edgewood, Pa., assignor to The Union Switch & Signal Company, Swissvale, Pa., a corporation of Pennsylvania Application June 28, 1939, Serial No. 281,544

11 Claims. (Cl. 246—2)

My invention relates to annunciating apparatus, and particularly to apparatus for registering the sequence of operation of a series of successive events or objects.

A feature of my invention is the provision of novel and improved means for registering indications relating to the sequence in operation of a selected series of events or objects. A further feature of my invention is the provision of novel and improved means for manually or automatically cancelling such indications one at a time when the corresponding event is acted upon, and for replacing the cancelled indication with another indication relating to an event yet to be acted upon.

Other features and advantages of my invention will appear as the specification progresses.

Annunciating apparatus of the character described is particularly useful for indicating the route designations of a series of objects or vehicles successively approaching a selected point in the sequence in which such objects or vehicles are to arrive at such selected point, wherewith means is provided for cancelling the indication concerning each object when the object with which it is related arrives at such point, and for progressing the indications registered so that the route designations of objects approaching the selected point are at all times indicated in the sequence in which such objects are to arrive at such point.

Apparatus embodying my invention is particularly well adapted for, but not limited to, train annunciating systems for indicating the route designations of a series of trains approaching a selected point in a sequence in which such trains are to arrive at such point.

I shall describe a preferred form of apparatus embodying my invention, and shall then point out the novel features thereof in claims.

Figure 1:
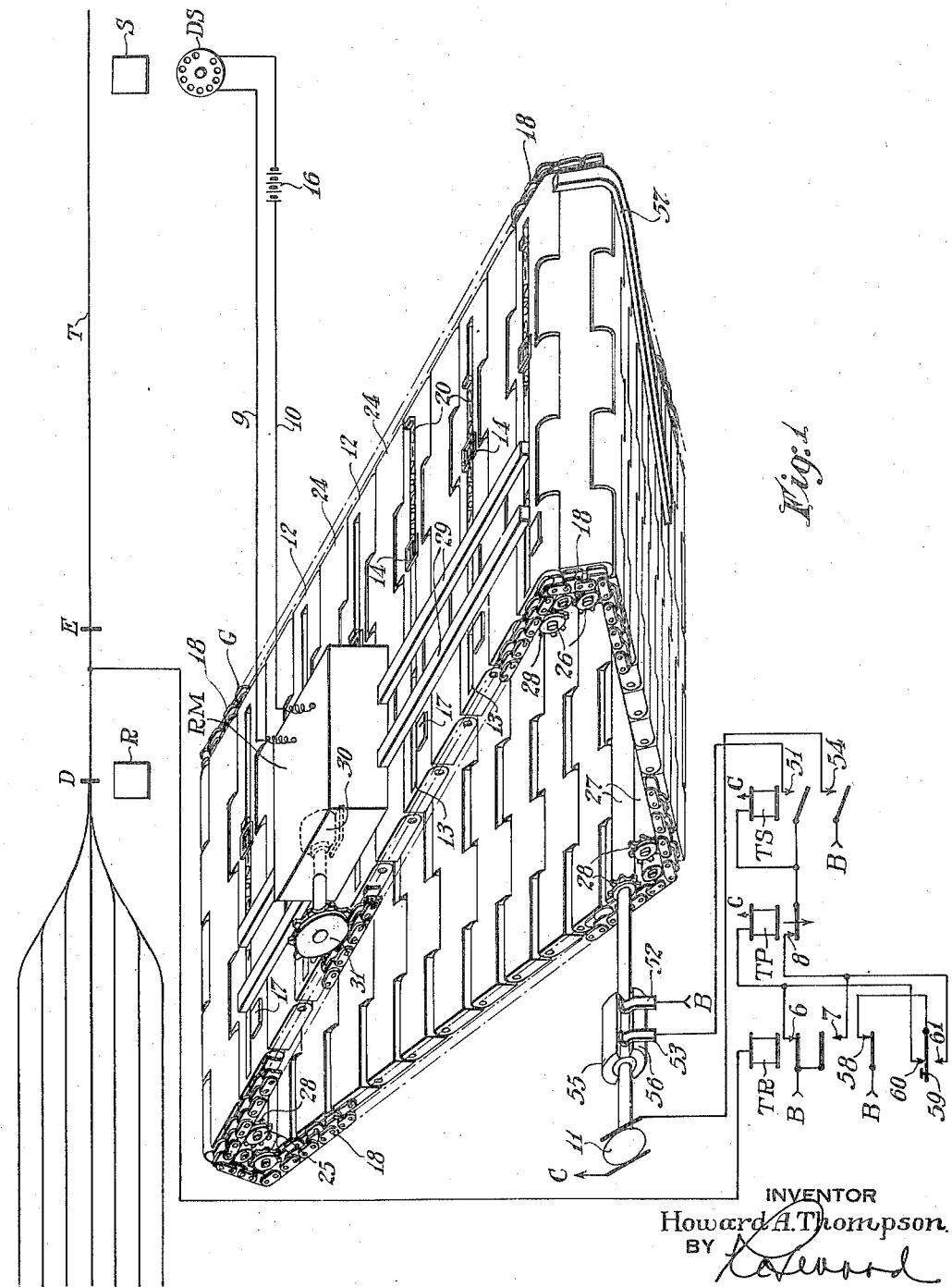
Figure 2:
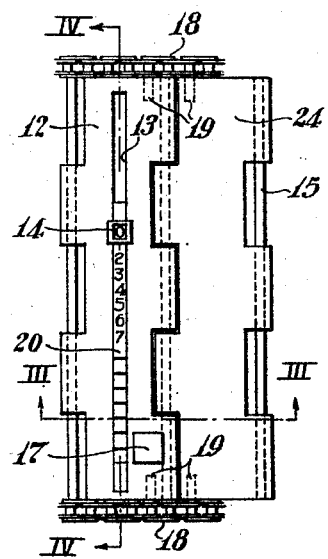
Figure 3:
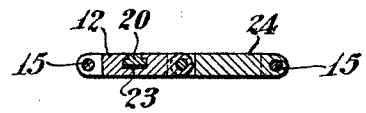
Figure 4:
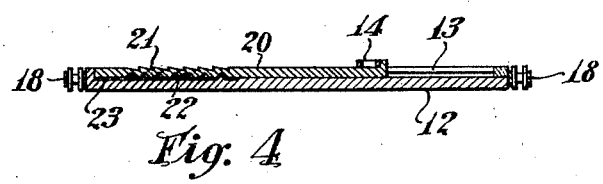
Figure 5:
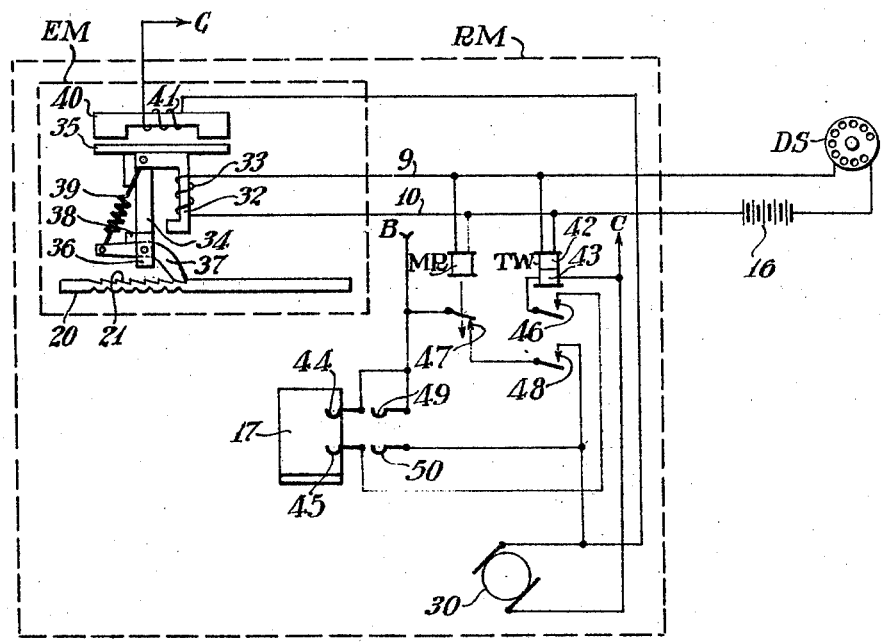

In the accompanying drawings, Fig. 1 is an isometric view of a preferred form of apparatus embodying my invention when applied to a train annunciating system. Fig. 2 is a top plan view of the links 12 and 24 shown in Fig. 1. Fig. 3 is a vertical sectional view taken substantially on the line III—III of Fig. 2. Fig. 4 is a vertical sectional view taken substantially on the line IV—IV of Fig. 2. Fig. 5 is a view showing diagrammatically the construction of the receiving means RM shown in Fig. 1.

Similar reference characters refer to similar parts in each of the several views.

Referring to Fig. 1, the reference character T designates a stretch of railway track which diverges, at its left-hand end as viewed in Fig. 1, into different routes, as will readily be understood by an inspection of Fig. 1. While track T is shown diverging into seven different routes, it will be understood that my invention is not restricted to the particular track layout illustrated.

Two stations or towers designated by the reference characters R and S are located along track T, station S being located adjacent the point from which westbound trains are to be dispatched on track T to station R. Station R, in accordance with the usual practice, is usually provided with an interlocking machine by means of which an operator may control the switches and signals governing traffic over the different divergent routes. Such interlocking machines and signals, which are not shown for the sake of simplicity since they form no part of my present invention, may take any one of the well-known types in present day use.

Adjacent station R, track T is provided with a control track section D—E which is provided in the usual manner with a track relay, designated by the reference character TR. Track relay TR is provided with a slow releasing repeater relay designated by the reference character TP. A stick relay, designated by the reference character TS, is provided with a pick-up circuit which may be traced from one terminal B of a suitable source of current, such as a battery not shown, through back contact 7 of relay TR, front contact 8 of relay TP and the winding of relay TS to the other terminal C of the source of current, and with a stick circuit which will be pointed out hereinafter.

In order to indicate at station R the route designation of trains dispatched from station S to station R along track T, in the sequence in which such trains are to arrive at station R, I provide station S and station R with annunciating apparatus embodying my invention. In the form of apparatus herein shown and described, the operator at station S transmits to station R a control signal as each train is dispatched from that station to station R. Each of the several divergent routes at station R is provided with a distinctive control signal, and the particular control signal transmitted from station S when a train is dispatched to station R is selected to correspond to the route designation of that train at station R.

The control signal is received and registered at station R, and a visual indication corresponding to the route of that train is displayed so that the operator at station R can set up the correct route for the train as it approaches the junction point adjacent station R. In order that a relatively large number of westbound trains, say, for example, six, may be spaced between stations S and R, the designation of each of the trains is registered and displayed in the sequence in which such trains are to arrive at station R. When a westbound train arrives at station R, cancellation of the indication relating to the route designation of that train is effected, either automatically or manually, and all other indications are progressed so that the indications register the route designations of the approaching trains in the sequence in which they are to arrive at station R.

The reference character DS designates transmitting means located at station S, and by means of which distinctive control signals, corresponding to the route designation of each train, are transmitted to station R. While any suitable form of transmitting means may be employed, as shown the transmitting means comprises an automatic telephone dial switch of the well-known form capable of transmitting code impulses of 1, 2, 3 and up to ten impulses over line wires 9 and 10. It is to be understood, of course, that my invention embraces the use of any suitable control signal system, and is not limited to the particular system herein shown as an illustration.

In order to register the route designation of the westbound trains dispatched from station S, I provide station R with receiving means, signal indication means, and means for cancelling one at a time the indications registered by such signal indication means. The cancelling means as shown comprises a supporting member G operatively connected with suitable means, here shown as an electric motor 11, for moving the member G in one direction. As can be seen in Fig. 1, the member G includes a plurality of links 12 and 24, which may, for example, take the forms as shown in Figs. 2, 3 and 4.

Referring now to Figs. 2, 3 and 4, links 12 and 24 as herein shown are preferably so arranged and constituted as to permit the links to be flexibly coupled or connected together. This flexible connection between the links may be established in any suitable manner, such as for example by providing protruding tongue portions on each link so arranged as to intermesh with protruding tongue portions provided on the next adjacent link, these tongues being drilled or formed with openings adapted to receive and journal a pivot rod 15. The links 12 and 24 are further provided on either end with sprocket chains 18 suitably pinned to the links by means of pins 19. Link 12 is also provided with a contact member 17 which is fastened to, but insulated from, the associated link, and with signal indication means, herein shown as a registration bar 20. Bar 20 is adapted to operate within a channeled portion 13 of link 12, this channeled portion extending substantially the length of its associated link and being provided with an indication registering space 14. As can be seen in Figs. 2, 3 and 4, each bar 20 is provided on its upper side with a plurality of indications, each relating to a different route west of station R, and with a plurality of inclined teeth 21, one tooth for each indication displayed by such bar. The bars 20 are further provided on their undersides with a plurality of notches 22, one for each registration, and which notches are adapted to be engaged by a spring member 23 fastened to the associated link and so arranged as to restrain the associated registration bar 20 by virtue of its spring bias from moving unless the bar is actuated by an external force. The link 24 is preferably similar in external dimensions and shape with link 12, but is not provided with a contact member 17 and a registration bar 20.

Referring once more to Fig. 1, the supporting member G as shown comprises, alternately, interlinked segments 12 and 24, which are preferably so interconnected and arranged as to form an endless flexible belt or tape operating over rolls 25, 26 and 27. The rolls 25, 26 and 27 preferably are so arranged that member G presents three substantially flat planes, one of which I shall term the top or indication plane, another of which I shall term the cancellation plane, and the other of which I shall term the third plane. Looking at Fig. 1, the indication plane is that shown substantially in a horizontal plane and extending from rolls 25 to rolls 26, the cancellation plane is that extending from the right-hand end of the horizontal plane, which terminates at rolls 26, down to the rolls 27, and the third plane extends from the rolls 27 up to the left-hand end of the horizontal plane, which terminates at rolls 25. Each of the rolls is provided with sprocket teeth 28 adapted to engage the sprocket chains 18 pinned onto segments 12 and 24 of member G, the rolls 25 and 26 as shown being idler rolls for forming the horizontal plane and maintaining the member G taut, and the rolls 27 being operatively connected with the electric motor 11, whereby the member G may be moved. As shown, one roll 27 is provided with a circuit controller comprising fixed contact members 52 and 53 and movable contact segments 55 and 56, the latter contact segments being insulated from, but fastened to the one roll 27.

A pair of supporting rails 29 disposed in any convenient manner in parallel relationship with the top or indication plane of the member G, serve to support the receiving means, which is designated as a whole by the reference character RM. As can be seen in Fig. 1, the receiving means is provided with a motor 30 (preferably provided with a suitable form of magnetic brake, not shown) which is operatively connected with a sprocket gear 31 constantly enmeshed with one of the sprocket chains 18 fastened to member G. The receiving means RM further comprises electroresponsive means, designated as a whole by the reference character EM and shown diagrammatically in Fig. 5, and which means may be influenced by the transmitting means DS. Referring now to Fig. 5, the electroresponsive means EM as shown comprises a magnetic structure 32 provided with a magnetizing winding 33 connected by means of the line wires 9 and 10 with the transmitting means DS and with a suitable source of current, such as a battery 16. Disposed in magnetic relationship with magnetic structure 32 is an armature member 34 pivotally attached at its upper end to an armature 35 and biased by any suitable manner (not shown) to its normal position as illustrated in Fig. 5. Member 34 is provided at its lower end with a bifurcated portion 36, and pivotally supported between the bifurcations of member 34 is a pawl 37, which is normally biased by means of a spring 39 to an engaging position against a stop 38 provided on member 34.

The armature 35, previously referred to as being attached to the armature member 34 and which (as shown) is also attached to magnetic structure 32, is disposed in magnetic relationship with a second magnetic structure 40 provided with a magnetizing winding 41. As can be seen in Fig. 5, when winding 41 of the second magnetic structure is deenergized, the member 34 and pawl 37 carried thereby are released to their lower position, wherein pawl 37 is adapted to engage the inclined teeth 21 of the registration bar 20 disposed immediately beneath the electroresponsive means EM. If, in this condition of the apparatus, control signals are transmitted by switch DS over wires 9 and 10, the winding 33 is alternately energized and deenergized in step with the control signal impulses. The armature member 34 is attracted towards magnetic structure 32 for each control impulse, thereby actuating pawl 37 toward the structure, and moving bar 20 one step. The member 34, returning to its normal condition in response to its bias during each interval between such impulses, actuates pawl 37 to its normal condition wherein it engages the next inclined tooth of the bar 20. The armature member 34 and pawl 37 repeat this operation for each control impulse received by the magnetizing winding 33, with the result that registration bar 20 is stepped forward one tooth and hence one indication, for each control impulse.

The receiving means RM may be moved along its rails independently of a movement of the member G so that relative motion is established between the receiving means and member G, and the receiving means may also be moved along its rails 29 in agreement with a movement of member G. This latter movement of receiving means RM is established by virtue of the fact that sprocket gear 31 (see Fig. 1) of the receiving means is constantly enmeshed with one of the sprocket chains 18 of member G, and is normally locked against rotation by the magnetic brake provided for motor 30 of receiving means RM. It can be seen, therefore, that with gear 31 locked against rotation and meshed with sprocket chain 18, when member G is moved in a manner to be presently pointed out, the movement of member G causes receiving means RM to move in agreement with member G so that the position of the receiving means with respect to the positions of the indication bars carried by member G remains the same. Movement of receiving means RM with respect to member G and independently of a movement of member G is established by control means for motor 30 governed by the transmitting means DS. The control means by which the transmitting means DS controls motor 30 of the receiving means to effect relative motion between the receiving means and member G will be pointed out in detail presently, but it should be pointed out at this time that the control means just referred to includes a slow releasing relay MR (see Fig. 5) connected across the line wires 9 and 10, and a two winding relay TW having its first winding 42 connected across the line wires 9 and 10.

Having thus described the various parts of the apparatus embodying my invention, I shall now explain their operation. I shall first assume that no westbound train has been dispatched from station S to station R, so that no indication relating to a train is registered by the apparatus at station R. In this condition of the apparatus, receiving means RM is positioned on its supporting rails 29 directly above the registration bar 20 nearest the right-hand edge (as viewed in Fig. 1) of the top or indication plane of member G. Member G and receiving means RM are stationary, their respective motors 11 and 30 being deenergized. Magnetizing windings 33 and 41 of receiving means RM are each deenergized, with the result that armature 34 is released and pawl 37 engages the first tooth provided on the registration bar 20 disposed immediately beneath receiving means RM.

With the apparatus in the condition just described, the operator at station S may transmit a control signal indicating a route designation west of a train being dispatched from station S to station R. If, for example, this train is to be routed on track 5 at station R, the operator at station S will operate the switch DS so that the control signal corresponding to route 5 is transmitted over the wires 9 and 10. Thus, if the operator dials the number 5, for example, five impulses may be transmitted over the wires 9 and 10, and received by magnetizing winding 33 provided upon magnetic structure 32 of receiving means RM. For each impulse of energy received, armature member 34 is attracted to actuate pawl 37, and the registration bar 20 disposed immediately beneath receiving means RM is thereby stepped forward five tooth spaces. The bar, moving in the channel portion of its associated link 12, now registers the indication 5 in the indication space 14 provided on its associated link.

The slow releasing relay MR becomes energized to pick up its armature upon the first impulse transmitted by switch DS, and preferably the relay is so adjusted as to maintain its armature in its picked-up condition during the interval of time between control impulses. The first winding 42 of the two-winding relay TW, upon receiving the first control impulse, also becomes energized to pick up its armature and thereby complete a stick circuit for its second winding 43, this circuit passing from terminal B through contact 44 of receiving means RM, contact 17 provided on the link 12 disposed immediately beneath receiving means RM, contact 45 of the receiving means, front contact 46 of relay TW, and the second winding 43 of relay TW to terminal C.

After the last impulse has been received from the line wires 9 and 10, relay MR maintains its armature in its picked-up position until the expiration of its slow release period, whereupon its armature is released and back contact 47 of relay MR is closed. This completes a first energizing circuit for motor 30 and the magnetic brake for that motor, with the result that motor 30 actuates gear 31 provided for receiving means RM to move the receiving means on its supporting rails 29, with respect to member G. The magnetizing winding 41, mounted upon the magnetic structure 40 provided for the receiving means RM, also becomes energized to attract its armature 35 and thereby lift armature member 34 and pawl 37 out of engagement with the registration bar 20 disposed beneath the receiving means. The first energizing circuit for motor 30 and magnetizing winding 41 may be traced from terminal B through back contact 47 of relay MR, front contact 48 of relay TW, and the winding of motor 30 in multiple with magnetizing winding 41, to terminal C. The movement of the receiving means from right to left, as viewed in Fig. 1, brings contacts 49 and 50 into engagement with the previously mentioned contact member 17 whereupon a second circuit including those two contacts and contact member 17 is completed for motor 30 and magnetizing winding 41. Further movement of the receiving means results in contacts 44 and 45 of receiving means RM moving off the previously mentioned contact member 17, thereby opening the previously traced stick circuit for the second winding 43 of relay TW, whereupon that relay releases to open at its front contact 48 the first traced circuit for motor 30 and magnetizing winding 41 of the receiving means RM. The motor 30 and winding 41, however, remain energized over their second-traced circuit until the receiving means is moved to a position wherein contacts 49 and 50 move past contact member 17, whereupon the second traced circuit for motor 30 and winding 41 is opened at these contacts, and actuation of receiving means RM is terminated. At this position of the receiving means, contacts 44 and 45 will have made contact with the contact member 17 provided on the next adjacent link 12 of member G, which link is provided with a registration bar 20, and which bar will then be disposed immediately beneath the electromagnetic means EM of the receiving means. The deenergization of magnetizing winding 41 mounted on the structure 40 results in the release of armature 35, with the result that armature member 34 is released to its lower position wherein its pawl 37 engages the first tooth of the registration bar 20 now disposed immediately beneath the electromagnetic means EM. The apparatus is thus conditioned for a control signal corresponding to the route designation of a second westbound train dispatched from station S to station R. In the event that a second train is dispatched over track T to station R, and the control signal corresponding to its designation is transmitted by the operator to station R, the receiving means RM will actuate the registration bar 20 immediately beneath it in step with the control signal, with the result that the bar will register in its indication space 14 the route designation of such second train. When the control signal is terminated, the receiving means RM will be moved in the manner hereinbefore set forth, until it is positioned over the next registration bar carried by member G. It is obvious that the receiving means will function in the manner just described to register each subsequent control signal relating to a train dispatched from station S, and will automatically move with respect to member G so as to be conditioned to actuate another registration bar carried by that member. In this connection, it should be pointed out that the top or indication plane of member G is preferably proportioned so that at least six registration bars 20 are carried at all times in that plane, in order that the previously assumed number (six) of trains may be dispatched from station S and their route designations may be registered at station R while the trains are at the same time occupying track T intermediate stations S and R. It is understood, of course, that any desired number of trains and their designations may be registered at station R prior to their arrival at the station, the maximum number of designations which may be registered being determined by the number of registration bars 20 carried on the indication plane of member G.

When a train arrives at the control section D—E, the member G is controlled, either automatically or manually, to move the registration bar 20 displaying the route designation for that train off the indication plane and down onto the cancellation plane of member G. This registration bar is preferably located nearest the right-hand edge of the horizontal plane of member G, and the movement of the member will be controlled in a manner to be explained presently, so as to continue the movement of the member until the next nearest registration bar is placed into the position formerly occupied by the now displaced registration bar displaying the designation of the train. This position I shall term the "first-to-arrive" position, and each bar 20 located on the indication plane of member G from right to left from that position indicates, respectively, the route designation of the "second-to-arrive," "third-to-arrive" and so forth trains, according to their position on the indication plane of the member.

Automatic control of the member G is established when the arriving train shunts the track relay TR provided for the control track section D—E. The closing of back contact 7 of relay TR completes the previously traced pick-up circuit for relay TS, with the result that relay TS picks up to close at front contact 54 a simple energizing circuit for motor 11, whereupon motor 11 actuates to rotate roll 27 to thereby actuate member G in a clockwise direction, as viewed in Fig. 1. After roll 27 has been rotated a few degrees, contact member 55 engages fixed contacts 52 and 53, and thereby completes the previously mentioned stick circuit for relay TS including circuit controller contact 52—55—53 and front contact 51 of relay TS, this stick circuit serving to hold relay TS energized when relay TP releases at the end of its slow release period to open the previously mentioned pick-up circuit for relay TS. The contact members 55 and 56, provided on roll 27, are so arranged that contact 52—55—53 or 52—56—53, as the case may be, is closed until member G is actuated sufficiently in a clockwise direction so that the registration bar 20 relating to the arriving train is moved off the indication plane and on to the cancellation plane of member G, and the next bar 20 is placed in the "first-to-arrive" position. When the next bar arrives at such position, the contact member 55 or 56 of roll 27 will then break engagement with the contacts 52—53 interposed in the stick circuit for relay TS, with the result that relay TS releases to open the energizing circuit for motor 11, whereupon further actuation of roll 27 and member G is terminated. It is readily apparent that when the next train arrives at section D—E, motor 11 will actuate member G in a similar manner to remove the registration bar 20 corresponding to that train off the indication plane and on to the cancellation plane of member G, and will move another bar relating to the next scheduled train to arrive into the "first-to-arrive" position on the indication plane of member G.

Manual control of the member G may be established by any suitable means, such as by a push button shown in Fig. 1. If desired, automatic control of member G may be dispensed with, in which case no track relay TR contacts will be employed in the control of the movement of member G, push-button contact 59—60 replacing front contact 6 of relay TR in the control of relay TP, back contact 7 of relay TR being replaced by push-button contact 61—59, and front contact 58 of relay TR being removed from its position interposed between push-button contact member 59 and terminal B. Thus, under the conditions just assumed, the operator at station R will depress the push-button member 59 whenever a train arrives at station R, thereby picking up relay TS and initiating the previously mentioned actuation of roll 27 and member G to control the positions of the registration bars 20 upon the indication plane of member G.

The control as shown in Fig. 1, however, permits both manual and automatic control of member G. As is readily apparent from an inspection of the drawings, automatic control of member G is established in the manner pointed out in detail heretofore, while manual control of member G may be established (when no train occupies section D—E so that relay TR is picked up to connect terminal B with push-button contact 59) by depressing contact member 59 so that relay TS picks up and is held up over a circuit passing from terminal B through front-contact 58 of relay TR, push-button contact 59—61, front contact 8 of relay TP, and the winding of relay TS to terminal C, to control motor 11 of member G until the actuation of that member establishes the previously traced stick circuit for relay TS, whereupon control of member G is continued in the manner previously explained in detail. This feature of my invention providing both automatic and manual control of member G may be desirable in the event that the operator at station S inadvertently signals an incorrect route designation for a train dispatched to station R. Thus, in the event that an incorrect route designation is transmitted, the operator at station S may notify the operator at station R, and then transmit the correct route designation for that train. The operator at station R may then suitably mark the registration bar displaying the incorrect designation, and when that bar arrives at the "first-to-arrive" position, may then depress the manually controlled contact member 59, thereby operating member G to remove that bar from its position, and moving into the "first-to-arrive" position the registration bar indicating the correct route designation for the train scheduled to arrive next at station R.

It is readily apparent from the foregoing that under normal conditions movement of member G is controlled automatically by the arrival of trains upon section G, but that when desired manual control of the movement of that member may be established. It follows, therefore, that apparatus embodying my invention provides means for at times moving the member G for cancelling one at a time the indications registered by the registration bars 20, and for progressing the bars so that the route designations of the trains arriving at section D—E are always displayed in the sequence in which such trains are to arrive.

Suitable restoring means may be provided for the cancellation plane of member G, for restoring each registration bar on that plane to its initial or zero registration position. As shown, the restoring means comprises a collection bar 57 disposed in parallel relationship with the cancellation plane of member G, and arranged to engage each registration bar 20 as it passes along that plane to force the bars against their spring bias into their initial registration position. It can be seen that when member G is moved in a clockwise direction so as to bring the registration bars back onto the indication plane of member G, the bars will be conditioned for actuation by the receiving means RM to indicate the route designation corresponding to the control signal received from station S.

Although I have herein shown and described only one form of annunciating apparatus embodying my invention, it is understood that various changes and modifications may be made therein within the scope of the appended claims without departing from the spirit and scope of my invention.

Having thus described my invention, what I claim is:

1. In an annunciating system, transmitting means operative to transmit a distinctive control signal for each of a plurality of different designations, receiving means influenced by said transmitting means, a member provided with a plurality of signal indication means adaptable of registering each of the different designations, means governed by said receiving means for causing a selected one of said signal indication means to register the designation corresponding to the control signal received by said receiving means, means governed by said transmitting means for moving said receiving means in one direction with respect to said member, whereby said receiving means is so positioned with respect to said member that a succeeding control signal received by said receiving means will cause another one of said signal indication means to register the designation corresponding to such succeeding control signal, and cancelling means operative at times for moving said member whereby the designations registered by said signal indication means are cancelled one at a time.

2. In an annuncitating system, transmitting means operative to transmit a distinctive control signal for each of a plurality of different designations, receiving means influenced by said transmitting means, a member provided with a plurality of signal indication means adaptable of registering each of the different designations, means governed by said receiving means for causing a selected one of said signal indication means to register the designation corresponding to the control signal received by said receiving means, means governed by said transmitting means for moving said receiving means in one direction with respect to said member, whereby another one of said signal indication means is selected by said receiving means to be caused to register the designation corresponding to a succeeding control signal received by said receiving means, and cancelling means operative at times to move said member and said receiving means for cancelling one at a time the designations registered by said signal indication means.

3. In an annunciating system for announcing at a remote point the designations of a series of objects in the sequence in which such objects are to arrive at a selected point, the combination of, transmitting means operative to transmit a distinctive control signal for each of a plurality of different designations, receiving means influenced by said transmitting means, a member provided with a plurality of signal indication means adaptable of displaying each of said different designations, means governed by said receiving means for causing a selected one of said signal indication means to register the designation corresponding to the control signal received by said receiving means, means governed by said transmitting means for moving said receiving means in one direction with respect to said member, whereby said receiving means is positioned with respect to said member that a succeeding control signal received by said receiving means will cause a different signal indication means to register the designation corresponding to such succeeding control signal, and means governed by an object arriving at said selected point for moving said member and said receiving means whereby the designation registered by the signal indication means relating to that object is cancelled.

4. Annunciating apparatus adapted to receive from a remote point distinctive control signals and to register indications corresponding to each distinctive control signal in the sequence in which such signals are received, comprising the combination of a member provided with a plurality of indication registration means each capable of registering a particular indication corresponding to the control signal received, receiving means capable of being influenced by each control signal, means for operatively connecting said receiving means with one of said indication registration means and being effective when influenced by a control signal for actuating said one registration means to its corresponding indication, means influenced by said control signals and effective when one of said indication registration means has been actuated for moving said receiving means with respect to said member, and control means carried by said member for controlling said last-mentioned means, whereby said receiving means is so positioned with respect to said member that the receiving means is adapted to be operatively connected with the next adjacent unactuated indication registration means.

5. Annunciating apparatus adapted to receive from a remote point distinctive control signals relating to the route designations of a plurality of trains and to register such route designations in the sequence in which the related trains are to arrive at a control section comprising, a member provided with a plurality of registration bars each capable of registering a particular indication for each of said designations, receiving means adapted to being influenced by said control signals and capable of actuating each registration bar to register the distinctive indication corresponding to such control signal, and means governed by each control signal for moving said receiving means independently of and with respect to said member, whereby said receiving means is positioned over an unactuated bar after having actuated a registration bar.

6. Annunciating apparatus adapted to receive from a remote point distinctive control signals relating to the route designations of a plurality of trains and to register such route designations in the sequence in which the related trains are to arrive at a control section comprising, a member provided with a plurality of consecutively arranged registration bars each capable of registering a plurality of indications one for each of said designations, cancelling means operative to move said member for positioning said plurality of registration bars one at a time at a first-to-arrive position, receiving means operated by said control signals and capable of actuating a selected registration bar to register the distinctive indication corresponding to a received control signal, means governed by each control signal for moving said receiving means independently of and with respect to said member, whereby said receiving means selects for actuation the next succeeding unactuated bar after having actuated a registration bar, and control means governed by the arrival of a train upon said control section for controlling the operation of said cancelling means whereby the registration bar which registers an indication relating to that train is moved from said first-to-arrive position and the next succeeding registration bar is moved into said first-to-arrive position.

7. Annunciating apparatus adapted to receive from a remote point distinctive control signals relating to the different route designations of a plurality of trains and to register such route designations in the sequence in which the related trains are to arrive at a control section comprising, a member provided with a plurality of registration bars each capable of registering a particular indication corresponding to each of said designations, receiving means adapted to being influenced by said control signals and capable of actuating a registration bar to register the distinctive indication corresponding to such control signal, means effective after the actuation of one of said registration bars for moving said receiving means independently of and with respect to said member, whereby said receiving means is conditioned for actuating an unactuated registration bar, and means for at times moving said member for cancelling one at a time the distinctive indications registered by said registration bars.

8. Annunciating apparatus adapted to receive from a remote point distinctive control signals relating to the different route designations of a plurality of trains and to register such route designations in the sequence in which the related trains are to arrive at a control section comprising, a member provided with a plurality of registration bars each capable of registering a particular indication corresponding to each of said designations, receiving means adapted to being influenced by said control signals and capable of actuating a registration bar to register the distinctive indication corresponding to such control signal, means effective after the actuation of one of said registration bars for moving said receiving means independently of and with respect to said member, whereby said receiving means is conditioned for actuating an unactuated registration bar, means for at times moving said member, and restoring means operative upon movement of said member for restoring said registration bars one at a time to their unactuated condition.

9. In combination, transmitting means operative to transmit one or another of a plurality of distinctive control signals, a flexible endless belt mounted on rollers in a manner to provide an indication plane, said belt being provided with a plurality of indication registering means each capable of registering a plurality of indications one for each of said plurality of control signals, receiving means disposed adjacent the indication plane of said belt and provided with electromagnetic means responsive to control signals transmitted from said transmitting means, means governed by said electromagnetic means for operatively connecting said receiving means with a selected one of said indication registering means for causing that indication registering means to register an indication corresponding to the control signal transmitted from said transmitting means, means governed by said transmitting means and effective after a control signal has been received by said receiving means for moving said receiving means in one direction with respect to said endless belt, control means provided on said endless belt for controlling said last-mentioned means, whereby said receiving means is operatively connected with the next adjacent indication registering means on the indication plane of said endless belt, and cancelling means operative at times for moving said endless belt whereby an indication registering means located on said indication plane of said member is moved therefrom.

10. Annunciating apparatus adapted to receive from a remote point distinctive control signals each relating to a route designation of a train and to register such designations in the sequence in which the related trains are to arrive at a control section, comprising the combination of, a flexible endless belt supported by rollers in a manner to provide an indication plane, a plurality of indication registration means carried by such belt, each indication registration means being capable when actuated for displaying an indication corresponding to the route designation relating to the control signal received from the remote point, receiving means disposed adjacent the indication plane of said belt and provided with electromagnetic means responsive to said control signals, means for operatively connecting said receiving means with one of said indication registration means whereby said electromagnetic means actuates that registration means in response to a control signal, means governed by said control signals and effective after said one registration means has been actuated for moving said receiving means with respect to said member, control means provided on said member for controlling the movement of said receiving means to position that means adjacent the next unactuated indication registration means carried on the indication plane of said member, whereby said receiving means may be operatively connected with that registration means, and means governed by a train arriving at said control section for moving said member, whereby the indication registration means displaying the route designation of that train is moved off of the indication plane of said member.

11. Annunciating apparatus adapted to receive from a remote point distinctive control signals each relating to a route designation of a train and to register such designations in the sequence in which the related trains are to arrive at a control section, comprising the combination of, a member or belt arranged to provide an indication plane, receiving means disposed adjacent the indication plane of said belt and provided with means responsive to said control signals for registering each control signal on said belt, means controlled by said control signals and effective after a control signal has been registered for moving said receiving means with respect to said belt, whereby said receiving means is positioned to register the next succeeding control signal, and means controlled by a train arriving at said control section for moving said belt, whereby to move the registration relating to that train off of the indication plane of said belt.

HOWARD A. THOMPSON.